(12) United States Patent
Scott et al.

(10) Patent No.: US 11,949,774 B2
(45) Date of Patent: Apr. 2, 2024

(54) SECURING HASH CHAINS VIA HYBRID CONSENSUS

(71) Applicant: Intuit Inc., Mountain View, CA (US)

(72) Inventors: Glenn Carter Scott, Los Altos Hills, CA (US); Michael Richard Gabriel, Milpitas, CA (US); Roger C. Meike, Mountain View, CA (US)

(73) Assignee: Intuit Inc.

( * ) Notice: Subject to any disclaimer, the term of this patent is extended or adjusted under 35 U.S.C. 154(b) by 124 days.

(21) Appl. No.: 17/219,517

(22) Filed: Mar. 31, 2021

(65) Prior Publication Data

US 2022/0321324 A1  Oct. 6, 2022

(51) Int. Cl.
*H04L 9/06* (2006.01)
*H04L 9/32* (2006.01)
*H04L 9/00* (2022.01)

(52) U.S. Cl.
CPC .......... *H04L 9/0643* (2013.01); *H04L 9/3218* (2013.01); *H04L 9/50* (2022.05)

(58) Field of Classification Search
CPC ........ H04L 9/0643; H04L 9/3218; H04L 9/50
See application file for complete search history.

(56) References Cited

U.S. PATENT DOCUMENTS

| 11,418,322 B2* | 8/2022 | Verma | H04L 9/0643 |
| 2019/0014100 A1* | 1/2019 | Scott | H04L 63/0807 |
| 2019/0081793 A1* | 3/2019 | Martino | H04L 9/0894 |
| 2019/0236594 A1* | 8/2019 | Ehrlich-Quinn | G06Q 20/401 |
| 2020/0348963 A1* | 11/2020 | Beberman | G06F 9/546 |

* cited by examiner

*Primary Examiner* — Lynn D Feild
*Assistant Examiner* — Vladimir I Gavrilenko
(74) *Attorney, Agent, or Firm* — Lathrop GPM LLP

(57) ABSTRACT

A method secures hash chains via hybrid consensus. A proximate payload for a proximate chain block for a proximate chain is obtained. A first identifier of the proximate chain and the proximate payload are hashed with a hash function to generate a second identifier of the proximate chain. The proximate chain block is added to the proximate chain. The proximate chain block includes the first identifier, the second identifier, and the proximate payload. A request to add the second identifier to a reporting chain is transmitted. A response indicating that the second identifier is incorporated into the reporting chain using the consensus mechanism is received.

20 Claims, 10 Drawing Sheets

SECURING HASH CHAINS VIA HYBRID CONSENSUS

BACKGROUND

Hash chains are data structures that record data in ever lengthening sequences of blocks. Due to the way blocks are computed, identified, and added to a hash chain, it is computationally difficult to modify or reorder blocks at any point in the chain without detection. However, simple hash chains do not require a consensus mechanism and are susceptible to replacement attacks that replace a portion or the entirety of the hash chain.

Blockchains are hash chains that address this issue by requiring consensus mechanisms that prevent the replacement of blocks within the chain. However, the consensus mechanisms introduce computational complexity and cost that hinders the speed at which new blocks may be added. A challenge is to reduce the susceptibility of hash chains to replacement attacks without hindering the speed at which blocks may be added to the system.

SUMMARY

In general, in one or more aspects, the disclosure relates to a method for securing hash chains via hybrid consensus. A proximate payload for a proximate chain block for a proximate chain is obtained. A first identifier of the proximate chain and the proximate payload are hashed with a hash function to generate a second identifier of the proximate chain. The proximate chain block is added to the proximate chain. The proximate chain block includes the first identifier, the second identifier, and the proximate payload. A request to add the second identifier to a reporting chain is transmitted. A response indicating that the second identifier is incorporated into the reporting chain using the consensus mechanism is received.

In general, in one or more aspects, the disclosure relates to a system including a server, including one or more processors and one or more memories, and an application executing on one or more processors of the server. A proximate payload for a proximate chain block for a proximate chain is obtained. A first identifier of the proximate chain and the proximate payload are hashed with a hash function to generate a second identifier of the proximate chain. The proximate chain block is added to the proximate chain. The proximate chain block includes the first identifier, the second identifier, and the proximate payload. A request to add the second identifier to a reporting chain is transmitted. A response indicating that the second identifier is incorporated into the reporting chain using the consensus mechanism is received.

In general, in one or more aspects, the disclosure relates to a method. A request to add a reporting payload to a reporting chain is received. The reporting payload includes a first identifier of a proximate chain. The reporting chain includes a second identifier of a first reporting chain block. The second identifier and the reporting payload are hashed with a hash function to generate a third identifier of the reporting chain. A second reporting chain block is added, using a consensus mechanism, to the reporting chain. The second reporting chain block includes the first identifier, the second identifier, and the third identifier. A response including the third identifier and indicating that the first identifier of the proximate chain is incorporated into the reporting chain is transmitted. Other aspects of the invention will be apparent from the following description and the appended claims.

DETAILED DESCRIPTION

Figure 1A:
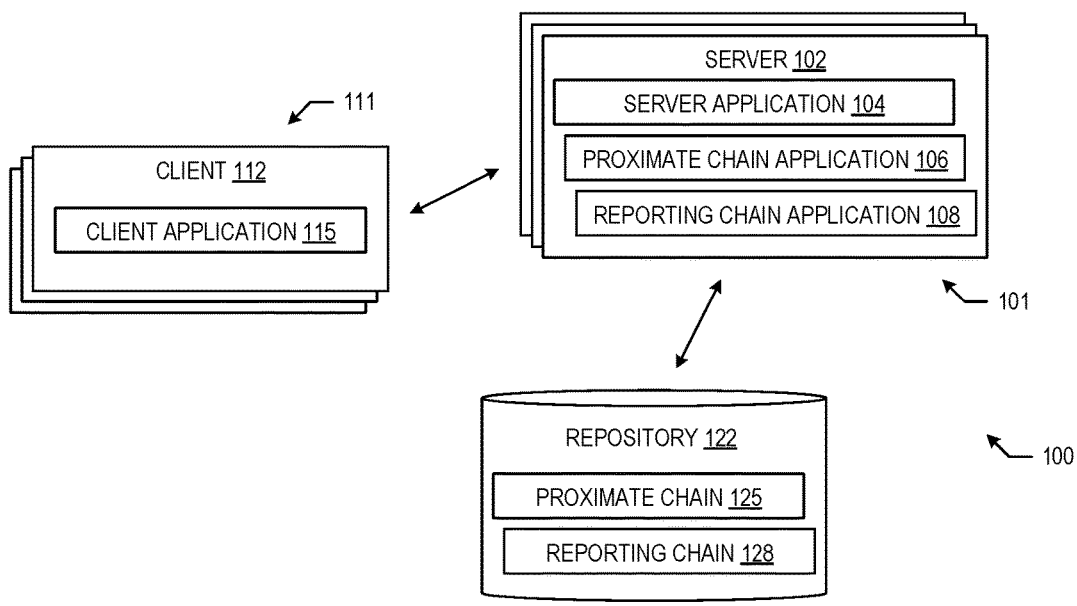
FIG. 1A, FIG. 1B, FIG. 1C, and FIG. 1D show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure securing hash chains via hybrid consensus. Hash chains are data structures that record data as an ever-lengthening chain of updates with each update containing a block. Blocks include an identifier generated by a cryptographic hash the tuple containing the identifier of the previous block and the data in the new update, referred to as the payload of the block. Due to the way hash chain updates are computed and identified, it is difficult to modify or reorder a block at any point in the chain without detection (except for the last block which may simply be replaced). A hash chain is verified by recomputing, for each block, the identifiers from the respective previous identifiers and payloads of the blocks. Generating new blocks to update a hash chain and verifying a hash chain are not computationally complex and are typically a high-speed operation. Hash chains form the foundation of public ledger technologies, including blockchain technologies as well as similar and derivative technologies.

Blockchains (including Bitcoin, Ethereum, etc.) use hash chains as their foundation but impose specific criteria on the ability to perform an update (i.e., to add a block to the chain). The criteria, a form of consensus mechanism, purposefully increases the computational cost of generating new blocks in order to promote good behavior by the programs that update the block chain (referred to as "mining" or "minting" new blocks to the chain) and prevent replacement attacks that could allow for double spending of the coins tracked by the block chain. Several types of consensus mechanisms exist, including proof of work and proof of stake consensus mechanisms.

Proof of work consensus mechanisms are a form of cryptographic zero-knowledge proof in which one party (the prover) proves to others (the verifiers) that a certain amount of computational effort has been expended for some purpose. Verifiers can subsequently confirm this expenditure with minimal effort on their part. Programs compete to generate and append the next block to the blockchain. In one embodiment, the proof of work includes identifying a hash value for the next block with a minimum number of leading zeros in the hash value by adding a nonce value to the payload of the block. Each miner has a probability of success in creating the next block that is proportional to the computational effort expended to generate the block. A feature of proof-of-work schemes is algorithmic asymmetry of the work being moderately hard (yet feasible) on the prover or requester side but easy to check for the verifier or service provider.

Proof of stake consensus mechanisms are an alternative to the proof of work consensus mechanisms. Instead of having the miners compete against each other solving computationally difficult problems, proof of stake uses a selection algorithm to identify the next stake holder to generate a block. With a proof of stake mechanism, the number of stakeholders (the different programs or entities that are authorized to generate the next block of the blockchain) is enumerated and one of the stakeholders is selected as being the stakeholder that may generate the next block for the blockchain. The probability that any one stakeholder will be selected may be proportional to the size of the stake of the stakeholder (favoring stakeholders with larger stakes) and to the length of time that the stakeholder has held the stake (favoring stakeholders who have held their stake longer). Additionally, the selection algorithm for identifying the next stakeholder may incorporate a proof of work algorithm.

Each consensus mechanism (proof of work or proof of stake) may require the use of considerable resources that slow down the rate at which updates may be made to a hash chain or blockchain that prohibits use in high-speed applications. For some applications, it may not be necessary to impose the costs of a consensus mechanism to each additional update to a hash chain. For example, a hash chain may be used to implement a workflow ledger, or other kind of similar function in which each update does not need to use a consensus mechanism.

Embodiments of the disclosure secure hash chains via hybrid consensus. Instead of recording data in a hash chain that is susceptible to a replacement attack, systems of the disclose store the data in a hash chain and then memorialize the state of the hash chain in an alternative medium.

In one embodiment, the alternative medium is a blockchain that uses a consensus mechanism that is not used by the original hash chain. Data generated by the system is stored in a hash chain without utilizing a consensus mechanism and a hash value from the hash chain is then stored to a blockchain that does utilize a consensus mechanism. For example, after adding blocks to a hash chain, the identifier of the latest block may form part of the payload of a block added to a block chain. If the original hash chain is attacked, then the identifier in the original hash chain will not match the identifier stored in the blockchain. Storing a hash value from the original hash chain in the blockchain provides the security of the consensus mechanism used by the blockchain and may reduce the computational cost required by the consensus mechanism by reducing the amount of information stored in the blockchain as compared to the original hash chain.

In one embodiment, the alternative medium (referred to as an indelible medium)) is a medium that is tangible and physical and is physically changed to store data and information. The indelible medium stores a hash value from the original hash chain. The indelible medium may be a newspaper, a magazine, a strand of deoxyribonucleic acid (DNA), etc.

Hash values may be of any length. As used herein, a hash value may be shown with four hexadecimal digits that is followed by an ellipsis that is followed by four hexadecimal digits (e.g., "1A23 . . . B4CD"), which may represent a 256 bit hash value.

Figure 1B:
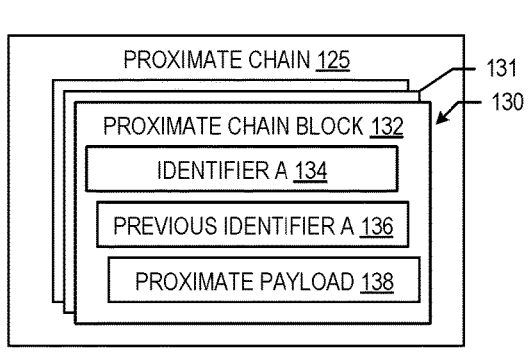
Figure 1C:
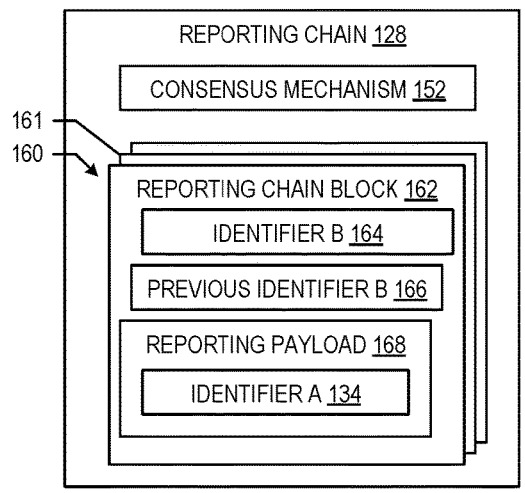
Figure 1D:
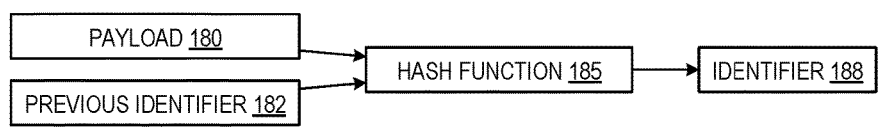

FIGS. 1A, 1B, 1C, and 1D show diagrams of embodiments that are in accordance with the disclosure. FIG. 1A shows a system (100) that secures hash chains via hybrid consensus. FIG. 1B shows the proximate chain (125) that store information generated by the system (100). FIG. 1C shows the reporting chain (128) that stores information about the proximate chain (125). FIG. 1D shows the hash function (185) that generates identifiers for hash chains. The embodiments of FIGS. 1A, 1B, 1C, and 1D may be combined and may include or be included within the features and embodiments described in the other figures of the application. The features and elements of FIGS. 1A, 1B, 1C, and 1D are, individually and as a combination, improvements to hash chain technology and computing systems. The various elements, systems, and components shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Turning to FIG. 1A, the system (100) secures hash chains via hybrid consensus. The servers (101) read and write data to the repository (122) in response to requests from the clients (111). The data is stored in the proximate chain (125), which is secured with hybrid consensus with reporting chain (128). The system (100) may be implemented using cloud computing environments with the servers (101) in accordance with the computing systems and networks described in FIGS. 4A and 4B.

The proximate chain application (106), operating on the server (102), reads data from, writes data to, and verifies the proximate chain (125). The proximate chain application (106) differs from the reporting chain application (108) by not using the consensus mechanism (152), which is part of the reporting chain (128). In one embodiment, the proximate chain application (106) reads data by generating a read request that includes, e.g., the identifier A (134), passes the read request to the repository (122), and receives a response that includes the proximate payload (138) of the proximate chain block (132). In one embodiment, the proximate chain application (106) writes data by generating a write request that includes, e.g., the proximate chain block (132) and sending the write request to the repository (122). In one embodiment, the proximate chain application (106) verifies the proximate chain (125) by generating and confirming each of the identifiers for each of the proximate chain blocks after a previously verified block (which may be the first block added to the proximate chain (125), also referred to as the genesis block).

The reporting chain application (108), operating on the server (102), reads data from, writes data to, and verifies the reporting chain (128). The reporting chain application (108) differs from the proximate chain application (106) by using the consensus mechanism (152) to generate the reporting chain blocks (160) of the reporting chain (128). In one embodiment, the reporting chain application (108) reads data by generating a read request that includes, e.g., the identifier B (164), passes the read request to the repository (122), and receives a response that includes the reporting payload (168) of the reporting chain block (162). In one embodiment, the reporting chain application (108) writes data by generating a write request that includes, e.g., the reporting chain block (162) and sending the write request to the repository (122). In one embodiment, the reporting chain application (108) verifies the reporting chain (128) by generating and confirming each of the identifiers for each of the reporting chain blocks after a previously verified block (which may be the genesis block of the reporting chain (128)).

The proximate chain (125) and the reporting chain (128) are stored in the repository (122). The proximate chain (125) is a hash chain that stores data generated by the system (100) and may do so without using a consensus mechanism. The reporting chain (128) includes information from the proximate chain (125) to protect the proximate chain (125) from replacement attacks and may use a consensus mechanism. The proximate chain (125) and the reporting chain (128) are further described in FIG. 1B and FIG. 1C, respectively.

The server application (104) is a program that executes on the server (102), which may include multiple programs used by the system (100) to interact with the clients (112) and the repository (122). The server application (104) implements hybrid consensus by using the different chain applications (the proximate chain application (106) and the reporting chain application (108)) that do not use the same consensus mechanism.

In one embodiment, the server application (104) hosts a website that reads and writes data to and from the repository (122) and sends and receives data to and from the client application (115), on the client (112). The server application (104) interacts with proximate chain application (106) to read and write data to the proximate chain (125) and interacts with the reporting chain application (108) to read and write data to the reporting chain (128). In one embodiment, the server application (104) uses using representational state transfer application programming interfaces (RESTful APIs) to communicate with the client application (115), the proximate chain application (106), and the reporting chain application (108).

The server (102) is one of the servers (101) and executes the applications (104), (106), and (108) that communicate with the clients (111) and the repository (122). The server (102) receives and responds to a request form the clients (112) of the clients (111) and stores data to the repository (122) in response to interactions with the client (112). Each of the programs running on the server (102) may execute inside one or more containers hosted by the server (102). The server (102) may be one of a set of virtual machines hosted by a cloud services provider to deploy the server application (104), the proximate chain application (106), and the reporting chain application (108). The server application (104), the proximate chain application (106), and the reporting chain application (108) may, individually and collectively, be combined to a single application and split to multiple applications.

The repository (122) is a computing system that may include multiple computing devices in accordance with the computing system (400) and the nodes (422) and (424) described below in FIGS. 4A and 4B. The repository (122) may be hosted by a cloud services provider. The cloud services provider may provide hosting, virtualization, and data storage services as well as other cloud services and to operate and control the data, programs, and applications that store and retrieve data from the repository (122). The data in the repository (122) may include the proximate chain (125) and the reporting chain (128), which are further described below.

The client application (115), operating on the client (112), interacts with the server (102) to present information of the system (100) stored in the proximate chain (125). In one embodiment, the client application (115) may be a web browser that accesses the applications running on the server (101) using web pages hosted by the server (101). In one embodiment, the client application (115) may be a web service that communicates with the applications running on the server (101) using representational state transfer application programming interfaces (RESTful APIs). Although FIG. 1A shows a client server architecture, one or more parts of the training application (114) and the server application (103) may be local applications on the developer device (124) and the client (112) without departing from the scope of the disclosure.

The client application (115) may include multiple interfaces (e.g., graphical user interfaces) for interacting with the system (100). A user may operate the client application (115) to perform tasks that retrieve and write information from and to data structures in the repository (122).

Figure 4A:
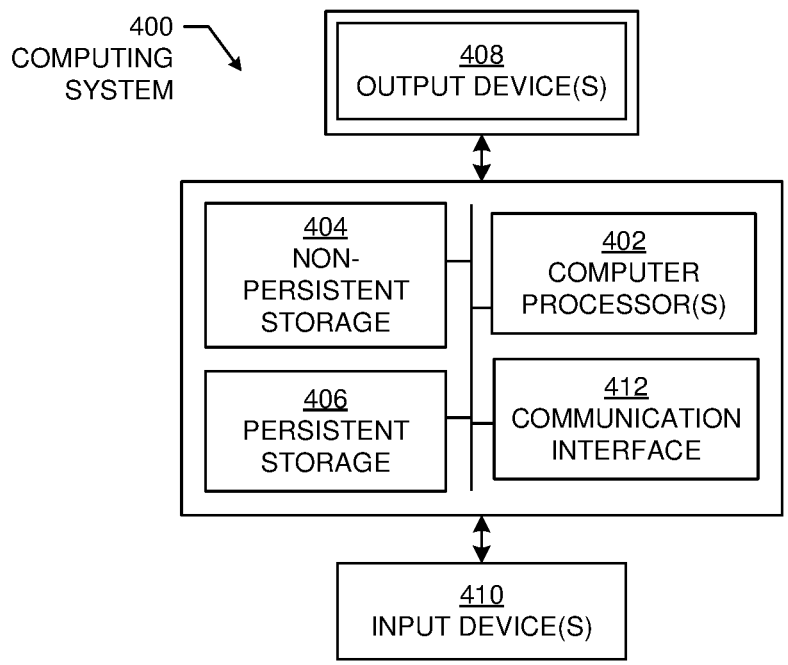
FIG. 4A and FIG. 4B show computing systems in accordance with disclosed embodiments.
Figure 4B:
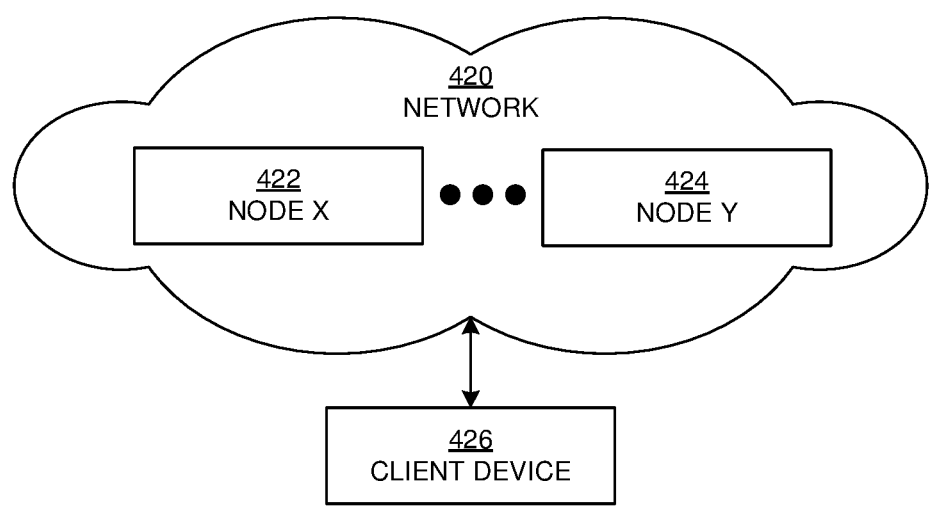

The clients (111), including the client (112), are embodiments of the computing system (400) and the nodes (422) and (424) of FIG. 4A and FIG. 4B. In one embodiment, the client (112) is a desktop personal computer (PC), a smartphone, a tablet, etc. The client (112) is used to access the present the data stored in the proximate chain (125).

Turning to FIG. 1B, the proximate chain (125) is one of the data structures stored with the repository (122). The proximate chain (125) is a hash chain that stores information that is used by the system (100) of FIG. 1A in the payloads of the proximate chain blocks (130).

The proximate chain (125) includes the proximate chain blocks (130), which include the proximate chain block (131) and the proximate chain block (132). The proximate chain block (132) is the current, or most recent, block appended to the proximate chain (125). The proximate chain block (131) is the previous block on the proximate chain (125) and is the last block appended to the proximate chain (125) before the proximate chain block (132) was appended to the proximate chain (125). The proximate chain block (132) includes the identifier A (134), the previous identifier A (136), and the proximate payload (138). In one embodiment, the proximate chain (125) may also store a count of the proximate chain blocks (130). In one embodiment, each of the reporting chain blocks (130) may store an ordinal identifier, which has the value of the count when the block was added to the proximate chain (125) and which may be used to reference the block withing the proximate chain (130).

The identifier A (134) is an identifier of the proximate chain block (132) of the proximate chain (125). The identifier A (134) is a hash value generated from the previous identifier A (136) and the proximate payload (138) with a cryptographic hash function, an example of which is further described in FIG. 1D.

The previous identifier A (136) is an identifier of the previous block (the proximate chain block (131)) of the proximate chain (125). In one embodiment, the previous identifier A (136) is stored in both the previous block (the proximate chain block (131)) and the current block (the proximate chain block (132)) of the proximate chain (125).

The proximate payload (138) is a data structure that stores information used by the system (100) of FIG. 1A. As an example, the information may include contact information or transaction information for users of the system. The contact information may include names, addresses, phone numbers, etc. The transaction information may include the descriptions, dates, amounts, etc. of financial transaction of the users of the system (100) (of FIG. 1A). In one embodiment, the identifier A (134) and the previous identifier A (136) may be included as part of the proximate payload (138).

Turning to FIG. 1C, the reporting chain (128) is one of the data structures stored with the repository (122). The reporting chain (128) is a hash chain that is a blockchain that uses a consensus mechanism. The reporting chain (128) stores information about the proximate chain (125) to prevent replacement attacks on the proximate chain (125). The information about the proximate chain (125) is stored in the payloads of the reporting chain blocks (160).

The reporting chain (128) includes the proximate chain blocks (160), which include the reporting chain block (161) and the reporting chain block (162). The reporting chain block (162) is the current, or most recent, block appended to the reporting chain (128). The reporting chain block (161) is the previous block on the reporting chain (128) and is the last block appended to the reporting chain (128) before the reporting chain block (162) was appended to the reporting chain (128). The reporting chain block (162) includes the identifier B (164), the previous identifier B (166), and the reporting payload (168) and uses the consensus mechanism (152). In one embodiment, the reporting chain (128) may also store a count of the reporting chain blocks (160). In one embodiment, each of the reporting chain blocks (160) may store an ordinal identifier, which has the value of the count when the block was added to the reporting chain (128) and which may be used to reference the block within the reporting chain (128).

The consensus mechanism (152) may be proof of work or proof of stake. Information for the consensus mechanism (152) may be stored in the payloads of the reporting chain blocks (160). When the consensus mechanism (152) is a proof of work mechanism, the reporting payload (168) may include a nonce value that causes the hash value of the identifier B (164) to include a minimum number of leading zeros. When the consistent back end is (152) is a proof of stake mechanism, reporting payload (168) may include a hash value of a map of stakeholders of the reporting chain (128).

The identifier B (164) is an identifier of the reporting chain block (162) of the reporting chain (128). The identifier B (164) is a hash value generated from the previous identifier B (166) and the reporting payload (168) with a cryptographic hash function, an example of which is further described in FIG. 1D. The cryptographic graphic hash function for the reporting chain (128) may be different from the cryptographic hash function for the proximate chain (125).

The previous identifier B (166) is an identifier of the previous block (the reporting chain block (161)) of the reporting chain (128). In one embodiment, the previous identifier be (166) is stored in both the previous block (the reporting chain block (161)) and the current block (the reporting chain block (162)) of the reporting chain (128).

The reporting payload (168) is a data structure that stores information from the proximate chain (125). The information from the proximate chain (125) may include hash values from the proximate chain (125). In one embodiment, the reporting payload (168) includes the identifier A (134) from the proximate chain block (132). In one embodiment, the reporting payload (168) may include a hash value generated from part or all of the proximate chain blocks (130). In one embodiment, the identifier B (164) and the previous identifier B (166) may be included as part of the reporting payload (168).

Turning to FIG. 1D, the hash function (185) may be used by the system (100) of FIG. 1A to generate the identifiers of the blocks for the proximate chain (125) and the reporting chain (128). Cryptographic hash algorithms that may be used by the hash function (185) include the MD series of algorithms (MD4, MD5, MD6, etc.), the SHA series of algorithms (SHA-1, SHA-2, SHA-256, SHA-512, etc.), the RIPEMD series of algorithms (RIPEMD, RIPEMD-128, RIPEMD-320, etc.), the Whirlpool algorithm, the BLAKE series of algorithms (BLAKE2s, BLAKE-256, BLAKE3, etc.), etc. Different instances of the hash function (185) and different hashing algorithms may be used, by the hash function (185), for the different chains and different applications used by the system (100) of FIG. 1A.

The hash function (185) implements a cryptographic hash algorithm that generates a hash value (also referred to as a digest) from an input. The hash function (185) receives the payload (180) and the previous identifier (182) as inputs and outputs the identifier (188). For the proximate chain (125), the payload (180) may correspond to the proximate payload (138) of FIG. 1B, the previous identifier (182) may correspond to the previous identifier A (136) of FIG. 1B, and the identifier (188) may correspond to the identifier A (134) of FIG. 1B. For the reporting chain (128), the payload (180) may correspond to the reporting payload (168) of FIG. 1C, the previous identifier (182) may correspond to the previous identifier B (166) of FIG. 1C, and the identifier (188) may correspond to the identifier B (164) of FIG. 1C.

Figure 2A:
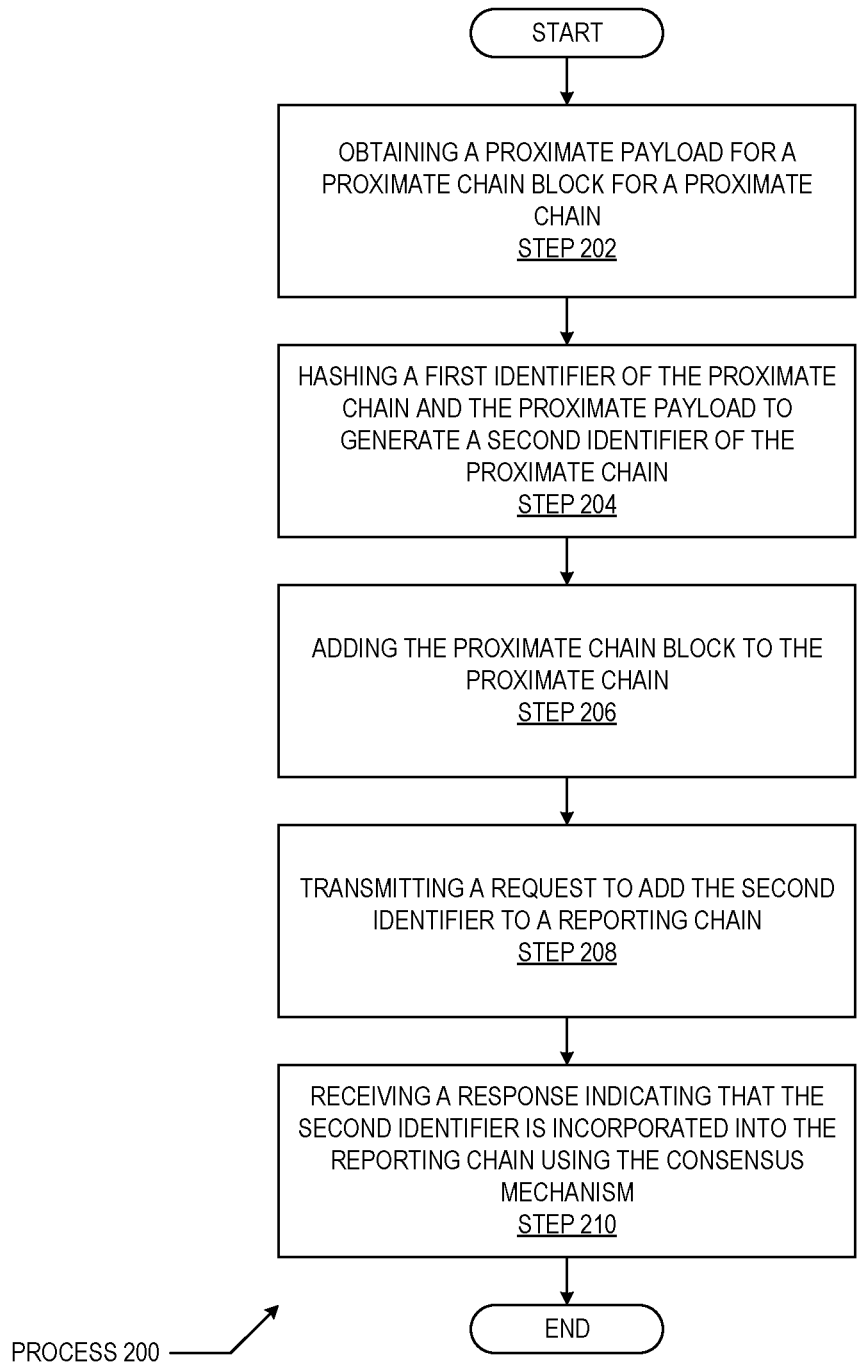
FIG. 2A and FIG. 2B show flowcharts in accordance with disclosed embodiments.
Figure 2B:
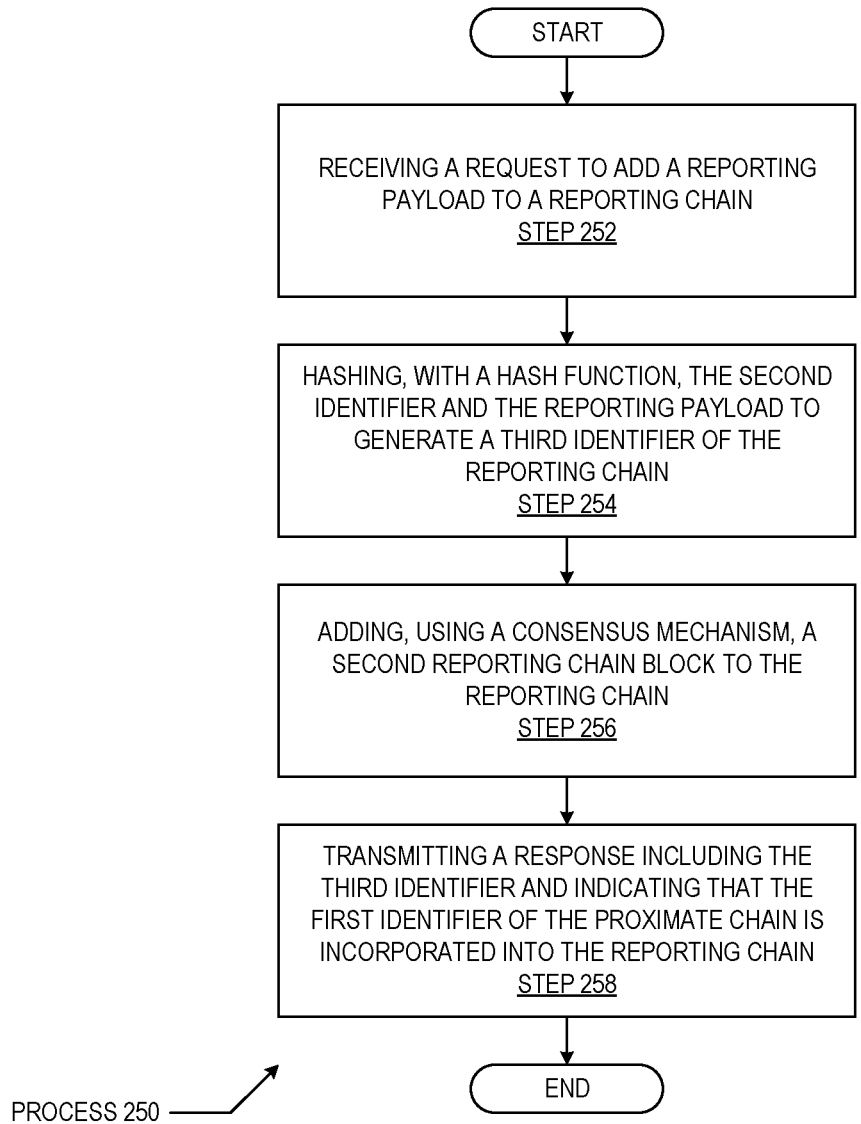

FIGS. 2A and 2B show flowcharts of processes in accordance with the disclosure. FIG. 2A is a flowchart of a method of a class for servicing update messages. FIG. 2B is a flowchart of a method of a client for communicating update messages with classes using broadcast addresses, unicast addresses, and an address cache. The embodiments of FIGS. 2A and 2B may be combined and may include or be included within the features and embodiments described in the other figures of the application. The features of FIGS. 2A and 2B are, individually and as an ordered combination, improvements to hash chain technology and computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) adds a proximate chain block to a proximate chain. The process (200) may be performed by a proximate chain application executing on a server.

At Step 202, a proximate payload for a proximate chain block for a proximate chain is obtained. In one embodiment, the proximate payload includes data generated by a system for a website. For example, the proximate payload may include personally identifying information, contact information, transaction information, etc.

At Step 204, a first identifier of the proximate chain and the proximate payload are hashed, with a hash function, to generate a second identifier of the proximate chain. The second identifier identifies a proximate chain block to be appended to the proximate chain to become the most recently added block to the proximate chain.

At Step 206, the proximate chain block is added to the proximate chain. The proximate chain block includes the first identifier, the second identifier, and the proximate payload. The first identifier, also referred to as a previous identifier, identifies the last proximate chain block added to the proximate chain before the most recent proximate chain block is added to the proximate chain. The proximate chain block is added by appending the block with the proximate payload to the proximate chain and updating a reference, for the current (i.e., most recently added) block of the proximate chain, to point to the proximate chain block with the proximate payload obtained at Step 202.

In one embodiment, the proximate chain block is added without using a consensus mechanism. In one embodiment, the proximate chain block is added to the proximate chain using a consensus mechanism, which may be done periodically (every minute, hourly, daily, weekly, etc.), using a cadence (e.g., every 100 blocks, 200 blocks, etc.), after specific events, etc. As an example, a nonce value for a proof of work consensus mechanism may be included with the proximate payload in the proximate chain block. The consensus mechanism used by the proximate chain may be different from the consensus mechanism used by the reporting chain. Differences may include the type of consensus mechanism (proof of stake, proof of work, etc.) as well as the periodicity, cadence, and events that trigger using the consensus mechanism in the proximate chain.

At Step 208, a request to add the second identifier to a reporting chain is transmitted. The second identifier may form at least a part of a reporting payload for a reporting chain block for the reporting chain.

In one embodiment, for each subsequent proximate chain block added to the proximate chain, a subsequent request to add a subsequent identifier to the reporting chain is transmitted. The identifier generated for each block added to the proximate chain may be added to the reporting chain. Adding each identifier for each proximate chain block to a reporting chain block in the reporting chain secures each block of the proximate chain.

In one embodiment, a subsequent request to add a subsequent identifier to the reporting chain is transmitted periodically. A subsequent request may be transmitted every second, minute, hour, day, week, month, etc. Transmitting the subsequent requests periodically may not capture the identifiers for each proximate chain block in the reporting chain but reduces the network traffic and computational cost to secure the proximate chain with the reporting chain.

In one embodiment, a subsequent request to add a subsequent identifier to the reporting chain is transmitted after adding a cadence threshold number of subsequent proximate chain blocks are added to the proximate chain. The cadence threshold may be every 150 blocks, 500 blocks, etc. Reducing the number of blocks added to the reporting chain by using a cadence reduces the network traffic and computational cost to secure the proximate chain with the reporting chain.

In one embodiment, a subsequent request to add a subsequent identifier to the reporting chain is transmitted in response to an event. The event may be identified in an event notification message received by the system. As an example, when a user clicks on a web page, the click event may trigger the transmission of the subsequent request. In one embodiment, the click event may indicate that an agreement is reached to initiate an account or process a loan application. Other prior events for collecting data (name, password, amount, etc.) may be recorded to the proximate chain in multiple proximate chain blocks each having an identifier without having each of the identifiers of the proximate chain blocks being requested to be added to the reporting chain.

In one embodiment, use of the reporting chain is initiated after generating the proximate chain. Preexisting hash chains may be extended to use a reporting chain to record hash values and identifiers from the preexisting hash chains to secure the preexisting hash chains. Additionally, the type and style of reporting chain may be changed during the lifetime of a hash chain and may include multiple different styles. For example, a hash chain may initially store data without using a reporting chain, then be updated to use a reporting chain with a cadence threshold, then be updated to also use a period reporting, and then be updated to further use event based reporting.

In one embodiment, a set of proximate chain blocks added to the proximate chain is verified. Verification of the set of proximate chain blocks may be in response to one of a read request, a write request, and a verification request received after transmitting the request to add the second identifier to the reporting chain. Any number of blocks may be added to the proximate chain after transmitting the request to add the second identifier. Verifying proximate chain blocks that have most recently been added to the proximate chain without verifying the entirety of the proximate chain maintains the security of the proximate chain while reducing the computational cost for verifying the data stored in the proximate chain.

At Step 210, a response indicating that the second identifier is incorporated into the reporting chain using the consensus mechanism is received. The response may include an identifier for the reporting chain block that includes an identifier from the proximate chain.

In one embodiment, updates to the reporting chain are reflected back to the proximate chain. A third identifier of the reporting chain, corresponding to a reporting chain block, is received in the response indicating that the second identifier is incorporated into the reporting chain. The third identifier identifies the reporting chain block that includes the second identifier from the proximate chain.

A fourth identifier (from the proximate chain) and a subsequent payload (for the reporting chain and including the third identifier) are hashed, using the hash function, to generate a fifth identifier for the proximate chain. The fourth identifier (from the proximate chain) may be different from the second identifier (from the proximate chain) when additional proximate chain blocks are added to the proximate chain before the third identifier (from the reporting chain) is received. When no additional proximate chain blocks are added to the proximate chain before the 3rd identifiers received, the fourth identifier and the second identifier may be the same.

A subsequent proximate chain block is added to the proximate chain. The subsequent proximate chain block includes the third identifier, the fourth identifier, and the fifth identifier.

In one embodiment, the second identifier is recorded in a physical medium. Recording the second identifier to a physical medium may be additional to or in lieu of incorporating the second identifier into the reporting chain. Examples for incorporating the second identifier to a physical medium include printing the second identifier in a newspaper, writing the second identifier onto a woodgrain ball, printing the second identifier to a sheet of paper.

Turning to FIG. 2B, the process (250) adds a reporting chain block to a reporting chain. The process (250) may be performed by a proximate chain application executing on a server.

At Step 252, a request to add a reporting payload to a reporting chain is received. The reporting payload includes a first identifier of a proximate chain. The reporting chain includes a second identifier of a first reporting chain block. Adding the first identifier from the proximate chain to the reporting chain helps to secure the proximate chain against a replacement attack.

At Step 254, the second identifier and the reporting payload are hashed, with a hash function, to generate a third identifier of the reporting chain. The third identifier is for a new reporting chain block to be added to the reporting chain. Other information and data in addition to the reporting payload may be included in the payload for the reporting chain block in being added to the reporting chain. For example, the reporting payload may include a hash value generated from the identifiers of the set of proximate chain blocks that were added to the proximate chain after a previous reporting chain block was added to the reporting chain (and which included an identifier from the proximate chain.

At Step 256, a second reporting chain block is added to the reporting chain using a consensus mechanism. The second reporting chain block includes the first identifier (from the proximate chain), the second identifier (identifying the previous block of the reporting chain), and the third identifier (identifying the block added to the reporting chain).

At Step 258, a response that includes the third identifier and indicating that the first identifier of the proximate chain is incorporated into the reporting chain is transmitted. The response may be sent by a reporting chain application and received by a proximate chain application.

Figure 3A:
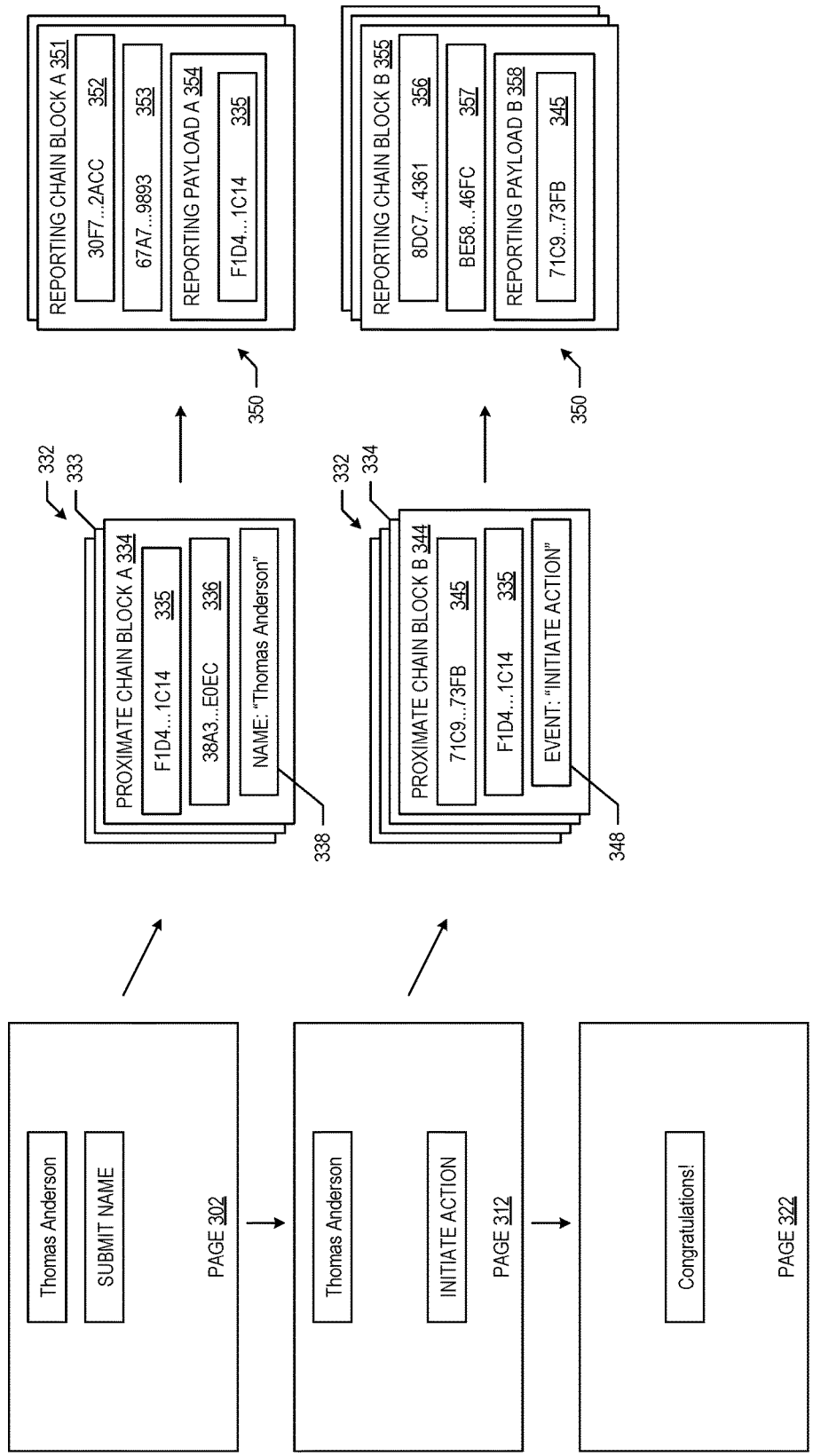
FIG. 3A, FIG. 3B, FIG. 3C, FIG. 3D, FIG. 3E, and FIG. 3F show an example in accordance with disclosed embodiments.
Figure 3B:
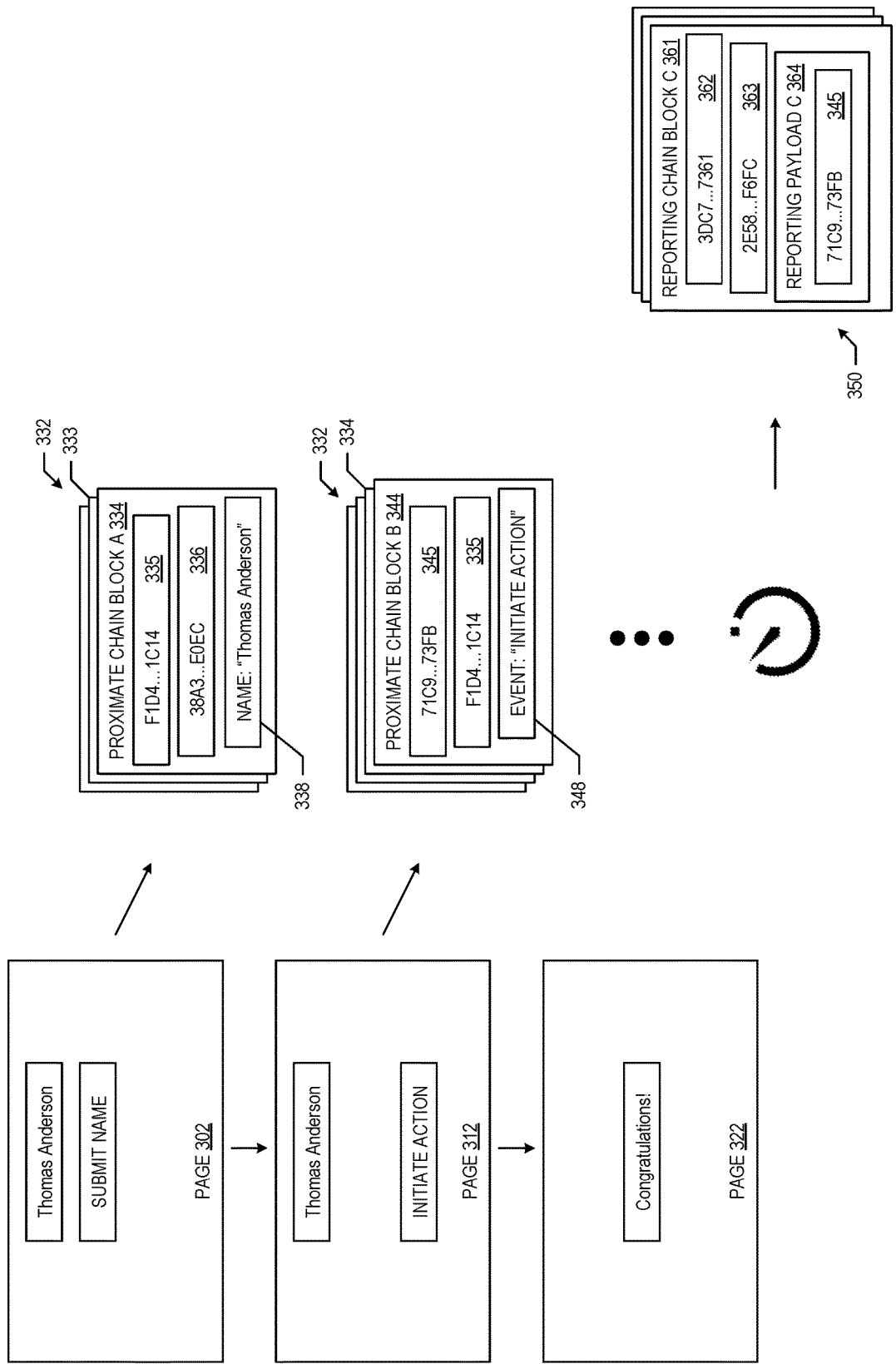
Figure 3C:
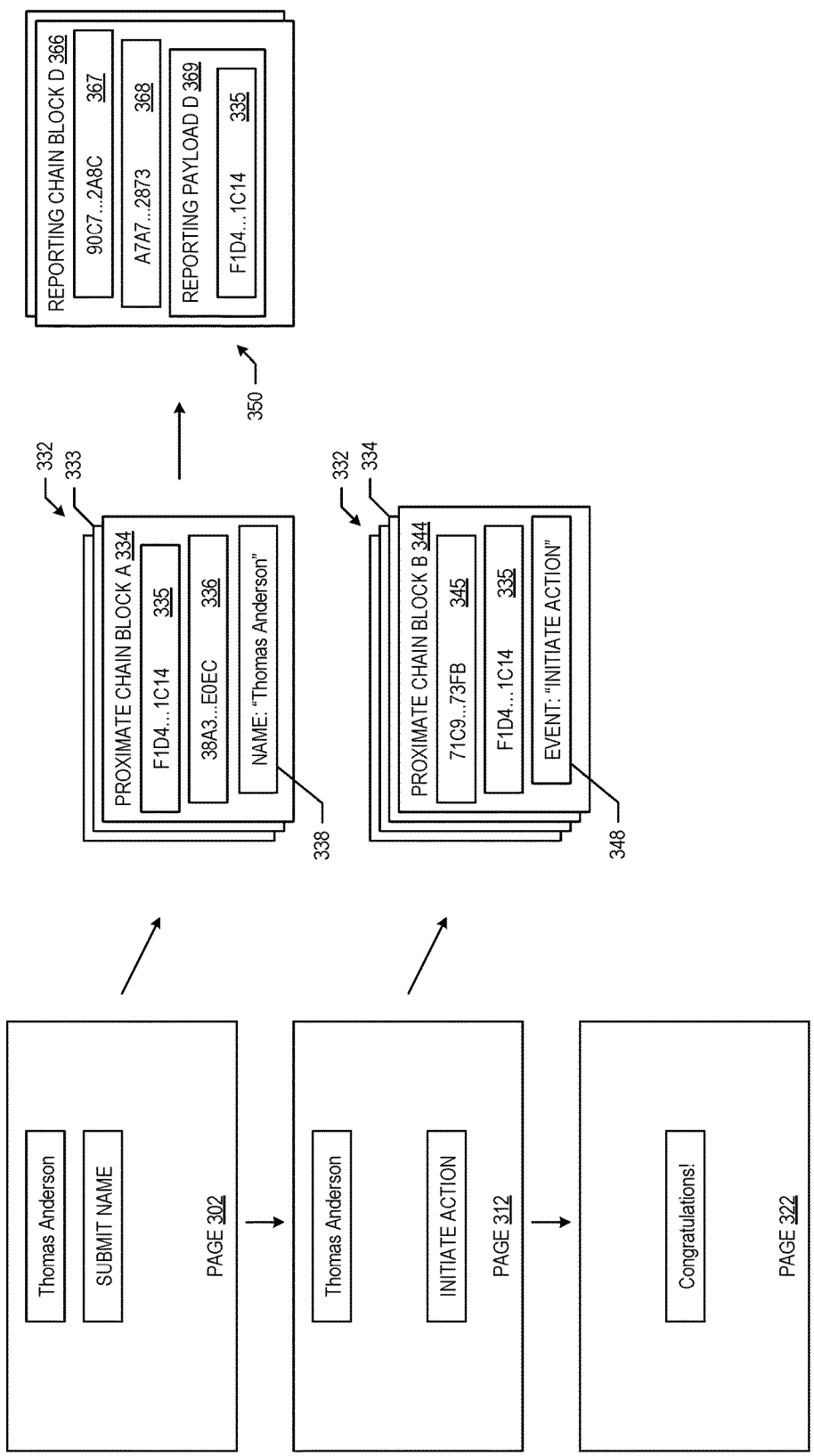
Figure 3D:
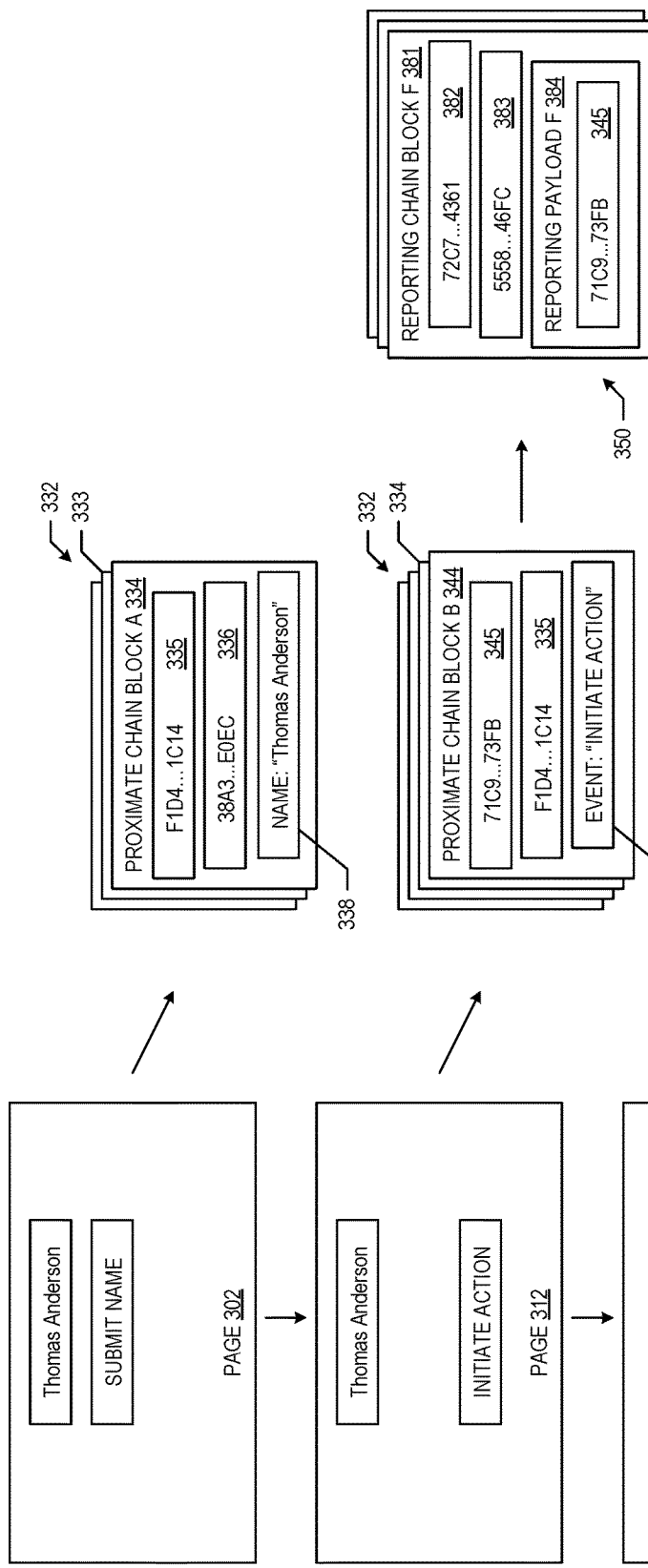
Figure 3E:
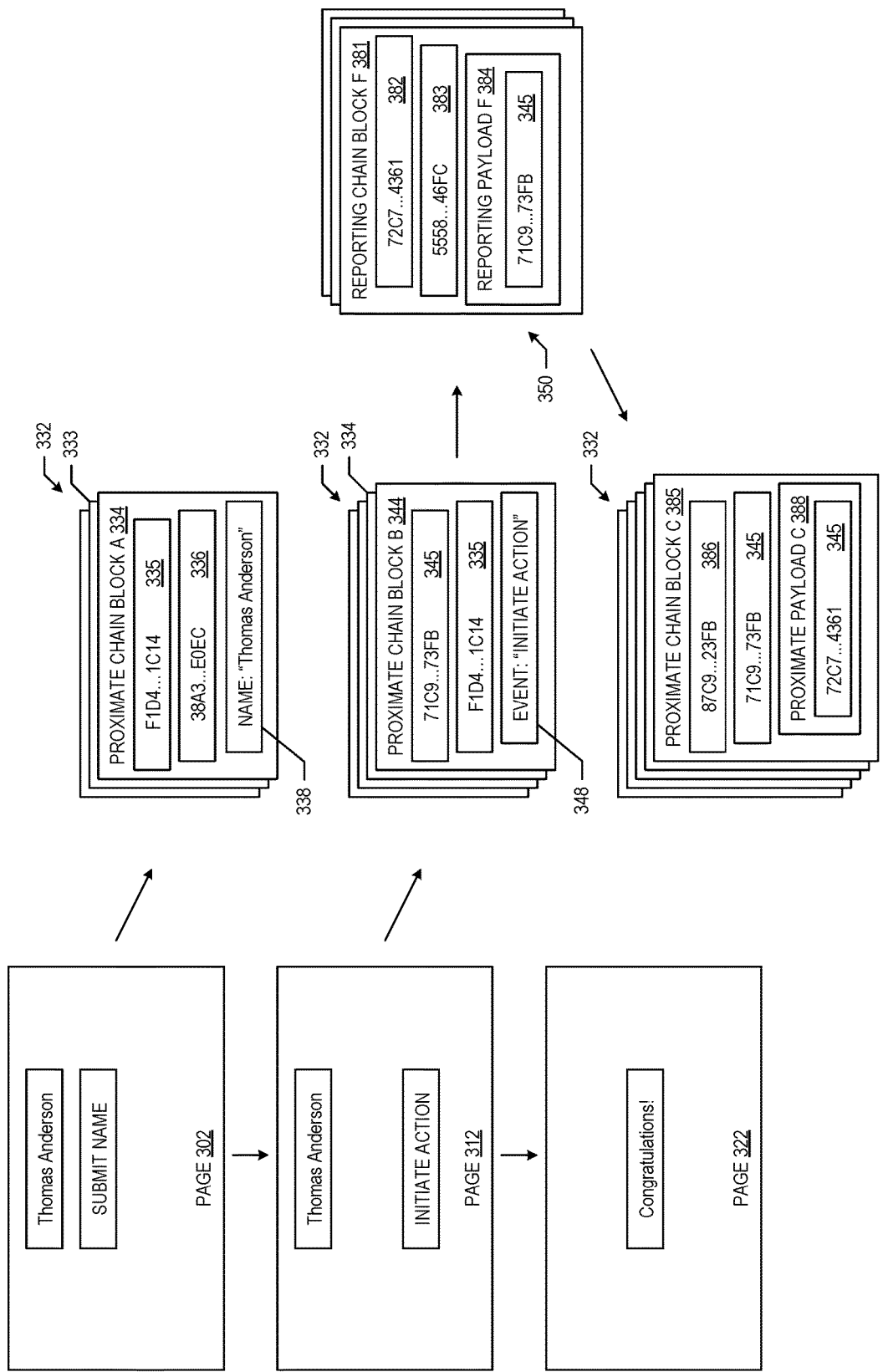
Figure 3F:
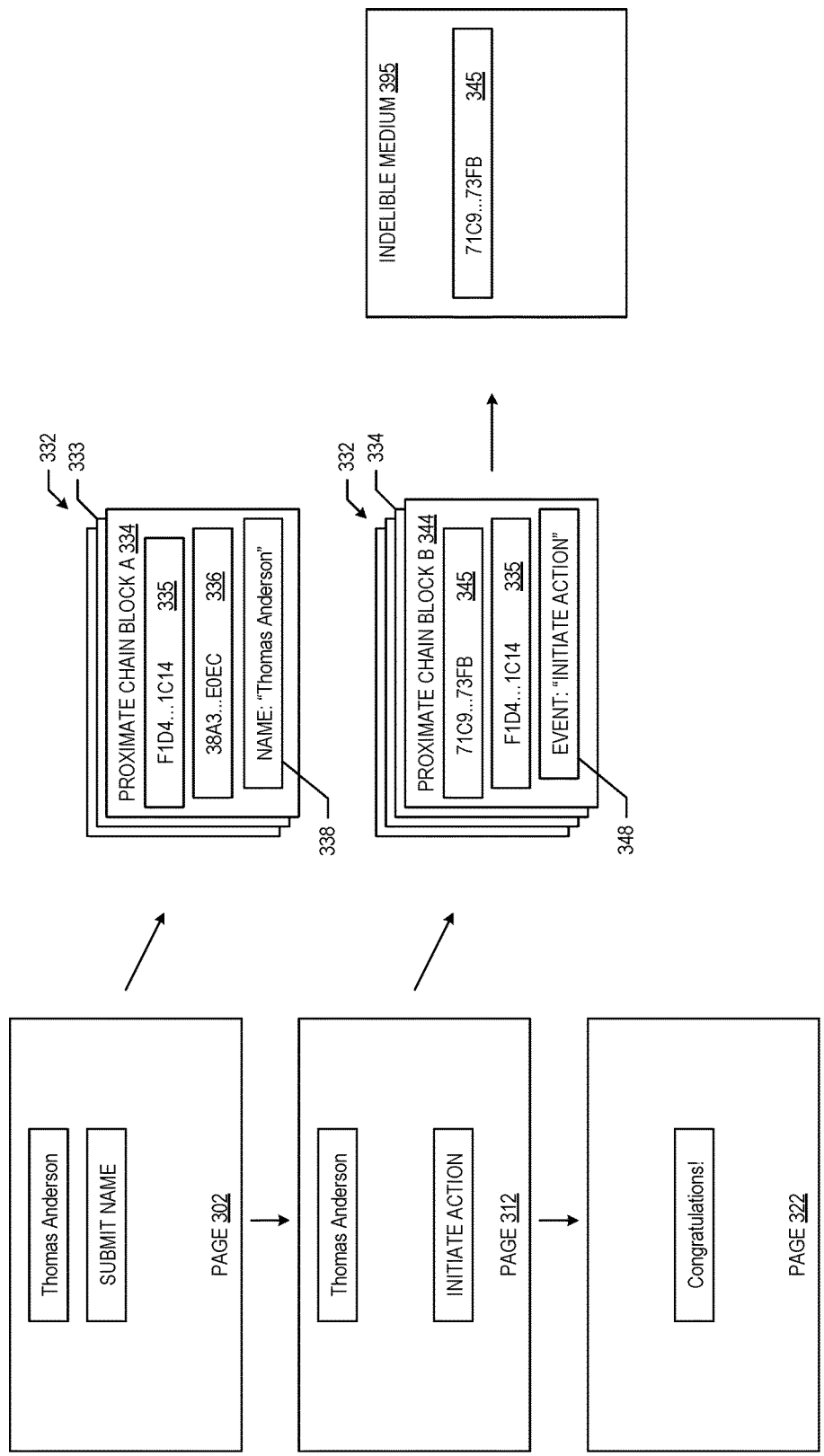

FIGS. 3A, 3B, 3C, 3D, 3E, and 3F show examples of systems and sequences that secure hash chains in accordance with the disclosure. FIG. 3A shows an embodiment for securing a hash chain with a block chain in which each block of the hash chain may be secured. FIG. 3B shows an embodiment for securing a hash chain with a block chain on a periodic basis. FIG. 3C shows an embodiment for securing a hash chain with a block chain using a cadence. FIG. 3D shows an embodiment for securing a hash chain with a block chain on an event basis. FIG. 3E shows an embodiment for securing a hash chain with a block chain and reflecting the update to the block chain back to the hash chain. FIG. 3F shows an embodiment for securing a hash chain in an indelible medium. The embodiments shown in FIGS. 3A, 3B, 3C, 3D, 3E, and 3F may be combined and may include or be included within the features and embodiments described in the other figures of the application. The features and elements of FIGS. 3A, 3B, 3C, 3D, 3E, and 3F are, individually and as a combination, improvements to hash chain technology and computing systems. The various features, elements, widgets, components, and interfaces shown in FIGS. 3A, 3B, 3C, 3D, 3E, and 3F may be omitted, repeated, combined, and/or altered as shown. Accordingly, the scope of the present disclosure should not be considered limited to the specific arrangements shown in FIGS. 3A, 3B, 3C, 3D, 3E, and 3F.

Turning to FIG. 3A a user interacts with a website using the pages (302), (312), and (322), which are sent from a server to a client and viewed by the user. The interaction is stored in the proximate chain (332), which is secured with the reporting chain (351).

In response to viewing the page (302), the user enters the name "Thomas Anderson" and clicks on the submit name button. In response to the submit name button being clicked, the system adds the proximate chain block A (334) to the proximate chain (332).

The proximate chain block A (334) includes the identifier (335), the previous identifier (336), and the proximate payload (338), the identifier (335), having a value of "F1D4 . . . 1C14", identifies the proximate chain block A (334) in the proximate chain (332). The previous identifier (336), having a value of "38A3 . . . E0EC", identifies the proximate chain block (333), which is the previous block in the proximate chain (332). The proximate payload (338) includes the information entered using the page (302), which includes the name "Thomas Anderson".

After the proximate chain (332) is updated to include the proximate chain block A (334), the system reports the update to the reporting chain (350). The reporting chain (350) is updated to include the reporting chain block A (351), which includes the identifier (352), the previous identifier (353), and the reporting payload A (354). The identifier (352), having a value of "30F7 . . . 2ACC", identifies the reporting chain block A (351) within the reporting chain (350). The previous identifier (353), having a value of "67A7 . . . (9893)", identifies the previous reporting chain block in the reporting chain (350). The reporting payload A (354) includes the identifier (335) from the proximate chain block A (334) securing the proximate chain (332). In one embodiment, the reporting payload A (354) may include additional or alternative information. For example, the reporting payload A (354) may include a hash of the proximate chain block A (334) that is generated from the identifier (335), the previous identifier (336) and the proximate payload (338) being concatenated together.

After page (302) is used to submit the information to the system, he paid (312) is sent to the client. The page (312) displays the name information and includes an initiate action button. In response to selection of the initiate action button, the system initiates an action. Actions that may be initiated include creating an account, processing a loan application, etc. Additionally, selecting the initiate action button generates an event that is recorded by the system to the proximate chain (332).

The proximate chain (232) is updated a second time to include the proximate chain block B (344) for the event from the selection of the initiate action button. The proximate chain block B (344) includes the identifier (345), the identifier (335), and the proximate payload (348). The identifier (345), having a value of "71C9 . . . 73FB", identifies the proximate chain block B (344) within the proximate chain (332). The identifier (335) in the proximate chain block B (344) identifies the proximate chain block A (334) as the previous block in the proximate chain (332). The proximate payload (348) includes information of the event and indicates that the event received by the system is an "initiate action" event. In one embodiment, the proximate payload (348) may include additional information. For example, the proximate payload (348) may include all the information needed for a loan application, may include an account number for a newly generated account, etc.

After the proximate chain (332) is updated a second time to include the proximate chain block B (344), the system reports the second update to the reporting chain (350). The reporting chain (350) is updated a second time to include the reporting chain block B (355), which includes the identifier (356), the previous identifier (357), and the reporting payload B (358). The identifier (356), having a value of "8DC7 . . . (4361)", identifies the reporting chain block B (355) within the reporting chain (350). The previous identifier (357), having a value of "BE58 . . . 46FC", identifies the previous reporting chain block in the reporting chain (350), which may not be the reporting chain block A (351) since other systems may be updating the reporting chain (350). The reporting payload B (358) includes the identifier (345) from the proximate chain block B (344) securing the second update to the proximate chain (332).

Turning to FIG. 3B, a user interacts with a website using the pages (302), (312), and (322), however, instead of each update to the proximate chain (332) being reported (as with FIG. 3A), updates to the proximate chain (332) are reported periodically. The proximate chain block A (334) and the proximate chain block B (344) or both written to the proximate chain (332) as discussed in FIG. 3A. The periodic updates to the reporting chain (350) may be done using a timer. When the timer expires, the reporting chain block C (361) is added to the reporting chain (350). The reporting chain block C (361) includes the identifier (362), the previous identifier (363), and the reporting payload C (364). The identifier (362), having a value of "3DC7 . . . (7361)", identifies the reporting chain block C (361) within the reporting chain (350). The previous identifier (363), having a value of "2E58 . . . F6FC", identifies the previous reporting chain block in the reporting chain (350). The reporting payload C (364) includes the identifier (345) from the proximate chain block B (344) securing the proximate chain (332). The timer may be reset after each update to the reporting chain (350).

Turning to FIG. 3C, a user interacts with a website using the pages (302), (312), and (322). In the embodiment of FIG. 3C, updates to the proximate chain (332) are reported using a cadence. As an example, after every (100) updates to the proximate chain (332), an update is reported and made to the reporting chain (350).

The proximate chain block A (334) is a one hundredth update (e.g., the remainder of the count of the proximate chain block A (334) within the proximate chain (332) divided by the cadence of 100 is zero). The update of adding the proximate chain block (333) to the proximate chain (332) triggers an update to the reporting chain (350).

The reporting chain (350) is updated with the reporting chain block D (366). The reporting chain block D (366) includes the identifier (367), the previous identifier (368), and the reporting payload D (369). The identifier (367), having a value of "90C7 . . . 2A8C", identifies the reporting chain block D (366) within the reporting chain (350). The previous identifier (368), having a value of "A7A7 . . . (2873)", identifies the previous reporting chain block in the reporting chain (350). The reporting payload D (369) includes the identifier (335) from the proximate chain block A (334) securing the proximate chain (332). The reporting chain (350) may not be updated until after a cadence threshold number of blocks (e.g., 100) have been added to the proximate chain (332). The proximate chain block B (344) does not correspond to the next cadence threshold number and an update to the reporting chain (350) is not made.

Turning to FIG. 3D, a user interacts with a website using the pages (302), (312), and (322). In the embodiment of FIG. 3D, updates to the proximate chain (332) are reported based on a triggering event. As an example, after an "initiate action" event occurs, an update is reported and made to the reporting chain (350). The proximate chain block B (344) is added to the proximate chain (332) in response to selection of the initiate action button on the page (312).

The reporting chain (350) is updated with the reporting chain block F (381). The reporting chain block F (381) includes the identifier (382), the previous identifier (383), and the reporting payload F (384). The identifier (382), having a value of "72C7 . . . (4361)", identifies the reporting chain block F (381) within the reporting chain (350). The previous identifier (383), having a value of "(555)A . . . 46FC", identifies the previous reporting chain block in the reporting chain (350). The reporting payload F (384) includes the identifier (345) from the proximate chain block B (344) securing the proximate chain (332). The reporting chain (350) may not be updated until after another triggering event is received and detected by the system.

Turning to FIG. 3E, a user interacts with a website using the pages (302), (312), and (322). In the embodiment of FIG. 3E, after an event based update to the proximate chain (332) and to the reporting chain (350), the change to the reporting chain (350) is reflected back to the proximate chain (332).

After the reporting chain block F (381) is written to the reporting chain (350) (as discussed with FIG. 3D), the proximate chain block C (385) is added to the proximate chain (332). The proximate chain block C (385) includes the identifier (386), the previous identifier (345), and the proximate payload C (388). The identifier (386), having a value of "87C9 . . . 23FB", identifies the proximate chain block C (385) within the proximate chain (350). The previous identifier (345) is the identifier from the proximate chain block B (344) indicating that the proximate chain block B (344) is the previous block in the proximate chain (332). In one embodiment, additional blocks may be added to the proximate chain before information from the reporting chain (350) is reflected back to the proximate chain (332) and the previous identifier (345) may have a different value that does not identify the update to the proximate chain (332) that triggered the update to the reporting chain (350). The proximate payload C (388) includes the identifier (345) from the reporting chain block F (381).

Turning to FIG. 3F, a user interacts with a website using the pages (302), (312), and (322). In the embodiment of FIG. 3F, after an event based update to the proximate chain (332), the update to the proximate chain (332) is secured to the indelible medium (395). As an example, the indelible medium (395) may be a newspaper in which the identifier (345) (from the proximate chain block B (344)) is printed.

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    obtaining a proximate payload for a proximate chain block for a proximate chain;
    hashing, with a hash function, a first identifier of the proximate chain and the proximate payload to generate a second identifier of the proximate chain;
    adding the proximate chain block to the proximate chain, wherein the proximate chain block comprises the first identifier, the second identifier, and the proximate payload;
    transmitting a request to add the second identifier to a reporting chain; and
    receiving a response indicating that the second identifier, incorporated into the proximate chain without using a consensus mechanism, is incorporated into the reporting chain using the consensus mechanism.

2. The method of claim 1, wherein the proximate chain block is added without using the consensus mechanism.

3. The method of claim 1, further comprising:
    transmitting, for each subsequent proximate chain block added to the proximate chain, a subsequent request to add a subsequent identifier to the reporting chain.

4. The method of claim 1, further comprising:
    transmitting, periodically, a subsequent request to add a subsequent identifier to the reporting chain.

5. The method of claim 1, further comprising:
    transmitting, after adding a cadence threshold number of subsequent proximate chain blocks are added to the proximate chain, a subsequent request to add a subsequent identifier to the reporting chain.

6. The method of claim 1, further comprising:
    transmitting, in response to an event, a subsequent request to add a subsequent identifier to the reporting chain.

7. The method of claim 1, further comprising:
    receiving, in the response, a third identifier of the reporting chain corresponding to a reporting chain block;
    hashing, using the hash function, a fourth identifier from the proximate chain and a subsequent payload, comprising the third identifier, for the reporting chain to generate a fifth identifier for the proximate chain; and
    adding a subsequent proximate chain block to the proximate chain, wherein the subsequent proximate chain block comprises the third identifier, the fourth identifier, and the fifth identifier.

8. The method of claim 1, further comprising:
    initiating use of the reporting chain after generating the proximate chain.

9. The method of claim 1, further comprising:
    receiving the response, which indicates that the second identifier is recorded in a physical medium.

10. The method of claim 1, further comprising:
    receiving, by a reporting chain application from a proximate chain application, the request to add the reporting payload to the reporting chain;
    hashing, using a hash function of the reporting chain, a third identifier from the reporting chain and the reporting payload to generate a fourth identifier for the reporting chain;
    adding, using the consensus mechanism, a reporting chain block to the reporting chain, wherein the reporting chain block includes the second identifier and the reporting payload; and
    transmitting, to the proximate chain application, the response comprising the fourth identifier and indicating that the second identifier is incorporated into the reporting chain using the consensus mechanism.

11. The method of claim 1, further comprising:
    verifying a set of proximate chain blocks added to the proximate chain, wherein verifying the set of proximate chain blocks is in response to one of a read request, a write request, and a verification request received after transmitting the request to add the second identifier to the reporting chain.

12. A system comprising:
    a server comprising one or more processors and one or more memories; and
    an application, executing on one or more processors of the server, configured for:

obtaining a proximate payload for a proximate chain block for a proximate chain;

hashing, with a hash function, a first identifier of the proximate chain and the proximate payload to generate a second identifier of the proximate chain;

adding the proximate chain block to the proximate chain, wherein the proximate chain block comprises the first identifier, the second identifier, and the proximate payload;

transmitting a request to add the second identifier to a reporting chain; and receiving a response indicating that the second identifier, incorporated into the proximate chain without using a consensus mechanism, is incorporated into the reporting chain using the consensus mechanism.

13. The system of claim 12, wherein the proximate chain block is added without using the consensus mechanism.

14. The system of claim 12, wherein the application is further configured for:

transmitting, for each subsequent proximate chain block added to the proximate chain, a subsequent request to add a subsequent identifier to the reporting chain.

15. The system of claim 12, wherein the application is further configured for:

transmitting, periodically, a subsequent request to add a subsequent identifier to the reporting chain.

16. The system of claim 12, wherein the application is further configured for:

transmitting, after adding a cadence threshold number of subsequent proximate chain blocks are added to the proximate chain, a subsequent request to add a subsequent identifier to the reporting chain.

17. The system of claim 12, wherein the application is further configured for:

transmitting, in response to an event, a subsequent request to add a subsequent identifier to the reporting chain.

18. The system of claim 12, wherein the application is further configured for:

receiving, in the response, a third identifier of the reporting chain corresponding to a reporting chain block;

hashing, using the hash function, a fourth identifier from the proximate chain and a subsequent payload, comprising the third identifier, for the reporting chain to generate a fifth identifier for the proximate chain; and adding a subsequent proximate chain block to the proximate chain, wherein the subsequent proximate chain block comprises the third identifier, the fourth identifier, and the fifth identifier.

19. The system of claim 12, wherein the application is further configured for:

initiating use of the reporting chain after generating the proximate chain.

20. A method comprising:

receiving a request to add a reporting payload to a reporting chain, wherein the reporting payload comprises a first identifier of a proximate chain and wherein the reporting chain comprises a second identifier of a first reporting chain block;

hashing, with a hash function, the second identifier and the reporting payload to generate a third identifier of the reporting chain;

adding, using a consensus mechanism, a second reporting chain block to the reporting chain, wherein the second reporting chain block includes the first identifier, the second identifier, and the third identifier, wherein the second identifier is incorporated into the proximate chain without using a consensus mechanism; and transmitting a response comprising the third identifier and indicating that the first identifier of the proximate chain is incorporated into the reporting chain.

* * * * *